(12) United States Patent
Syrjärinne et al.

(10) Patent No.: US 11,585,944 B2
(45) Date of Patent: Feb. 21, 2023

(54) METHOD OF AND RECEIVER FOR MITIGATING MULTIPATH INTERFERENCE IN A GLOBAL NAVIGATION SATELLITE SYSTEM

(71) Applicant: u-blox AG, Thalwil (CH)

(72) Inventors: Paula Syrjärinne, Tampere (FI); Christoph J. Schmid, Dietikon (CH)

(73) Assignee: u-blox AG, Thalwil (CH)

( * ) Notice: Subject to any disclaimer, the term of this patent is extended or adjusted under 35 U.S.C. 154(b) by 86 days.

(21) Appl. No.: 17/090,688

(22) Filed: Nov. 5, 2020

(65) Prior Publication Data

US 2022/0137234 A1    May 5, 2022

(51) Int. Cl.
*G01S 19/22* (2010.01)
*G01S 19/29* (2010.01)
*G01S 19/32* (2010.01)

(52) U.S. Cl.
CPC .............. *G01S 19/22* (2013.01); *G01S 19/29* (2013.01); *G01S 19/32* (2013.01)

(58) Field of Classification Search
CPC .......... G01S 19/20; G01S 19/21; G01S 19/29; G01S 19/32
See application file for complete search history.

(56) References Cited

U.S. PATENT DOCUMENTS 3,936,830 A * 2/1976 Overbury .................. G01S 1/40
333/17.1
6,934,632 B2  8/2005 Hatch
9,329,274 B2  5/2016 Schipper et al.
10,324,194 B2  6/2019 Schüttpelz et al.
2009/0323779 A1  12/2009 Lennen
(Continued)

FOREIGN PATENT DOCUMENTS

CN    111103600 A  *  5/2020  ............ G01S 19/22
DE   102015012470 A1 *  3/2017  ............ G01S 19/22
(Continued)

OTHER PUBLICATIONS

S.-S. Jan et al., Reversion from L1-L5 Dual to L5 Single Frequency WAAS in the Presence of RF Interference, IEEE Transactions on Aerospace and Electronic Systems, vol. 46(3), p. 1110-1126, Jul. 2010 (Year: 2010).*
(Continued)

*Primary Examiner* — Bernarr E Gregory
*Assistant Examiner* — Fred H Mull
(74) *Attorney, Agent, or Firm* — Fish & Richardson P.C.

(57) ABSTRACT

A method of and a receiver for mitigating multipath interference in a global navigation satellite system. In accordance with an embodiment, GNSS signals are received from a plurality of satellites in at least two frequency bands. A likelihood indicator is determined which is indicative of how likely the received GNSS signals are affected by multipath interference. In response to the likelihood indicator, all GNSS signals from at least one frequency band of the at least two frequency bands are discounted. The received GNSS signals are processed by taking into account said discounting of all GNSS signals in the at least one frequency band. The discounting may include assigning less weight to the discounted frequency bands or disregarding each of the discounted frequency bands in their entirety.

20 Claims, 3 Drawing Sheets

(56) References Cited

U.S. PATENT DOCUMENTS

| | | | |
|---|---|---|---|
| 2012/0119951 A1 | 5/2012 | Vollath | |
| 2014/0369452 A1* | 12/2014 | Dubash | G01S 19/21 375/350 |
| 2018/0252819 A1 | 9/2018 | Gao et al. | |
| 2020/0132855 A1* | 4/2020 | Lee | G01S 19/22 |

FOREIGN PATENT DOCUMENTS

| | | | |
|---|---|---|---|
| EP | 1553424 | 7/2005 | |
| EP | 2793050 | 10/2014 | |
| WO | WO-2010102331 A1 * | 9/2010 | G01S 19/22 |

OTHER PUBLICATIONS

M.S. Grewal et al., Global Navigation Satellite Systems, Inertial Navigation, and Integration, Third Edition, Wiley, section 4.2.4, 2013 (Year: 2013).*

E.D. Kaplan et al., Understanding GPS: Principles and Applications, Second Edition, Artech House, Inc., p. 12-13, 2006 (Year: 2006).*

Felux et al., Ionospheric Monitoring in a Dual Frequency GBAS, Mar. 2016.

DeMartino, Broadcom Boosts Vehicle Navigation with New Dual-Frequency Receiver, Oct. 2017.

Jan, Aircraft Landing Using a Modernized Global Positioning System and the Wide Area Augmentation System, May 2003.

Pirsiavash, GNSS Code Multipath Mitigation by Cascading Measurement Monitoring Techniques, Jun. 19, 2018.

EP Extended Search Report in European Appln. No. 21206394.5, dated Mar. 23, 2022, 8 pages.

\* cited by examiner

METHOD OF AND RECEIVER FOR MITIGATING MULTIPATH INTERFERENCE IN A GLOBAL NAVIGATION SATELLITE SYSTEM

BACKGROUND OF THE INVENTION

The present invention relates to the field of global navigation satellite systems (GNSS). More particularly, the present invention relates to the field of mitigating multipath interference in GNSS.

GNSS is a satellite navigation system which utilizes signals transmitted from one or more constellations of satellites orbiting the earth. GNSS receivers are configured to receive the satellite signals and process them to determine a navigation solution. Such a navigation solution generally includes the position and velocity of the receiver as well as precise time. This can be referred to as Position, Velocity and Time or PVT. GNSS has proven to be highly accurate. However, because GNSS signals are electromagnetic, they can be blocked by objects such as mountains, tall buildings, and dense foliage.

Multipath is a major error source for GNSS receivers and can occur in situations where the direct GNSS signal is blocked and only a reflected satellite signal is received by the antenna of a GNSS receiver. However multipath effects can also occur when GNSS signals transmitted by a particular satellite travel by two or more paths to the GNSS receiver's antenna. In such situations, known as multipath interference, the GNSS receiver intercepts a direct or line-of-sight (LOS) component together with one or more non-line-of-sight (NLOS) components. The latter can be caused by the signals being reflected from objects such as mountains or buildings. The signals travelling different paths can experience fading and phase shifting which can cause measurement errors and/or compromise the correlation function shape used to estimate the time delay when processing the GNSS signals. In some environments, such as urban canyon environments, the GNSS signals can be subjected to a significant amount of multipath interference which can result in significant GNSS measurement errors.

A typical approach for mitigating multipath interference in GNSS involves detection and correction of individual affected navigation measurements. Typically, this is done during a signal processing stage. Such an approach may not always perform well. For example, heavy multipath interference tends to distort measurements in ways that are difficult to model reliably. Therefore, if the signals are severely degraded or if assumptions about properties of the degraded signals, such as uniformity of phase error, are not accurate, detection and correction of individual measurements may not yield accurate results.

What is needed, therefore, is an improved technique for mitigating multipath interference in GNSS.

SUMMARY OF THE INVENTION

The present invention provides a method of and a receiver for mitigating multipath interference in a global navigation satellite system. In accordance with an embodiment, GNSS signals are received from a plurality of satellites in at least two frequency bands. A likelihood indicator is determined which is indicative of how likely the received GNSS signals are affected by multipath interference. In response to the likelihood indicator, all received GNSS signals from at least one frequency band of the at least two frequency bands are discounted. The received GNSS signals are processed by taking into account said discounting of all received GNSS signals in the at least one frequency band. The discounting may include assigning less weight to the one or more discounted frequency bands or disregarding each of the discounted frequency bands in their entirety.

These and other aspects of the invention are described in more detail herein.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT OF THE INVENTION

Figure 1:
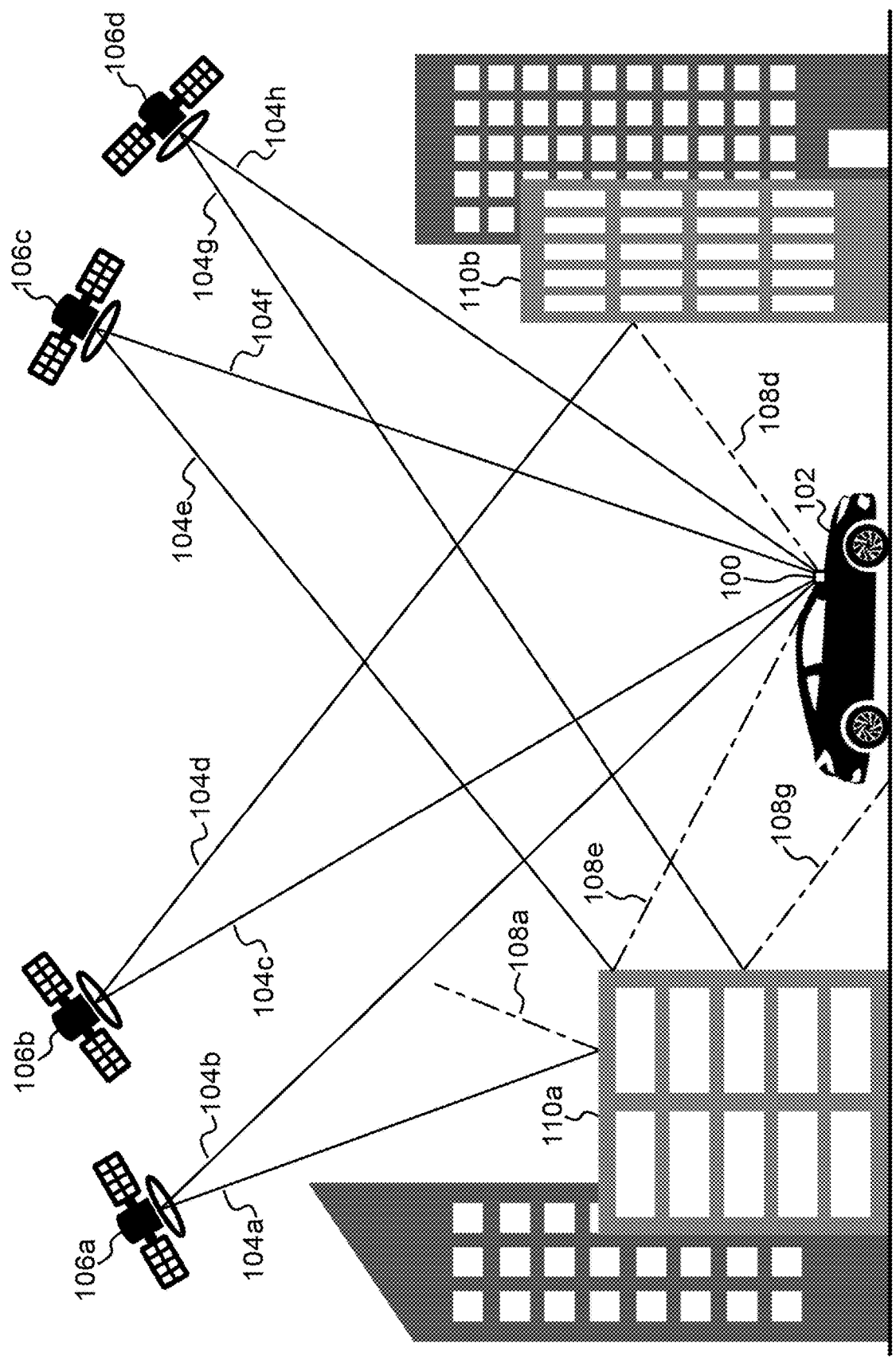
FIG. 1 illustrates a global navigation satellite system (GNSS) in accordance with an embodiment of the present invention.

The present invention provides a method of mitigating multipath interference in a global navigation satellite system (GNSS). A GNSS receiver can be configured to perform a method of mitigating multipath interference in accordance with an embodiment of the present invention. Accordingly, the present invention also provides a GNSS receiver which is configured to mitigate multipath interference in a global navigation satellite system (GNSS).

Currently there are four fully operational GNSSs: the United States' Global Positioning System (GPS), Russia's Global Navigation Satellite System (GLONASS), China's BeiDou Navigation Satellite System (BDS) and the European Union's Galileo. A GNSS receiver which can acquire and track two or more GNSSs concurrently is known as a multi-GNSS receiver.

GNSS satellites of these various systems typically transmit GNSS signals in more than one frequency band. By way of example, the frequency bands which are currently available under GPS include the L1, L2 and L5 bands. For the L1 signal band, the signal carrier frequency is generally in the range of 1.559 GHz to 1.610 GHz. For the L2 signal band, the signal carrier frequency is generally in the range of 1.18845 GHz to 1.258 GHz. And, for the L5 signal band, the signal carrier frequency is generally in the range of 1.164 GHz to 1.189 GHz. Additional or different frequency bands may become available in the future for GPS.

A GNSS receiver may operate in a single-band mode in which it performs signal processing to determine navigation measurements on signals in only one band, for example, the L1 band only or, as another example, the L5 band only. Alternatively, the GNSS receiver may operate in a dual- or multi-band mode in which it performs signal processing using signals in multiple bands within a particular constellation, for example, L1 and L5 dual-band mode in GPS. As another example, a GNSS receiver may be configured to operate in a multi-band mode in which three or more signal bands are utilized (e.g., L1, L2 and L5). It is generally expected that multi-band processing will achieve more accurate navigation measurements than single-band processing.

However, because they are transmitted in different frequency bands and due to other differences in properties, the L1, L2 and L5 frequency band signals tend to have different susceptibilities to multipath interference. In general, L1 signals tend to be more affected by multipath than are L5 signals. Therefore, in accordance with an embodiment of the present invention, a determination is made as to whether the received GNSS signals are likely being affected by multipath interference. If the determination is affirmative (i.e. that multipath interference is likely occurring), then an entire band of signals (e.g., the entire band of L1 signals), can be discounted. The discounting can include disregarding the affected band in its entirety. Alternatively, the discounting can include assigning less weight to all the GNSS signals received in the affected band. Further, if multipath interference is likely affecting multiple frequency bands, then the multiple bands affected by multipath interference may be discounted. For example, in a system utilizing three or more GNSS bands, one of the affected bands may be categorically discounted by assigning less weight to all satellite signals received in that band while another one of the affected bands may be discarded in its entirely, i.e. discarding all satellite signals received in the other band. It is expected that under multipath interference conditions, discounting or discarding one or more entire bands of signals will provide improved position accuracy at the expense of reduced availability of GNSS signals for computing a position fix.

When the source of multipath interference is no longer present, e.g. the GNSS receiver moves away from an urban canyon environment, operation may resume with the affected band or bands no longer being discounted. The temporary discarding of the whole L1 band, and using L5 instead, for example in GPS, has not been possible previously because L5 signals have only recently been added to GPS.

FIG. 1 illustrates a global navigation satellite system in accordance with an embodiment of the present invention. A GNSS receiver 100 located in a vehicle 102 moving within a multipath environment is shown. GNSS satellite signals 104a-h are transmitted from a plurality of satellites 106a-d. As shown, some signals from the transmitted satellite signals 104a-h may comprise LOS signals 104b, 104c, 104f and 104h because they travel to the GNSS receiver 100 via a direct path. Other signals from the transmitted satellite signals 104a-h however may comprise non-LOS signals 104a, 104d, 104e and 104g because they are reflected by obstacles within the environment. In the present example, the obstacles comprise buildings 110a and 110b. The building 110a reflects GNSS satellite signals 104a, 104e and 104g resulting in reflected satellite signals 108a, 108e and 108g, respectively. GNSS satellite signal 104d on the other hand is reflected by building 110b, resulting in reflected satellite signal 108d. Some of the reflected satellite signals may be reflected in the direction of the vehicle 102 and thus reach the GNSS receiver 100. Others on the other hand may be reflected in a different direction. In the present example, reflected GNSS satellite signals 108d and 108e are intercepted by the GNSS receiver 100 whereas reflected satellite signals 108a and 108g are reflected in different direction and are therefore not intercepted by the GNSS receiver 100. It will be apparent that more or fewer satellites may present at any one time. More particularly, GPS presently consists of at least 24 active and 3-5 spare satellites in the earth's orbit, while four satellites are generally required to uniquely determine the position of the receiver 100 in three dimensions. Reception of GNSS signals from greater than four satellites can improve position accuracy.

The satellites 106a-d are each configured to transmit GNSS signals 104a-h in two or more frequency bands. The two or more frequency bands can be selected from among the currently available bands. For example, if the GNSS receiver 100 comprises equipment for receiving and processing GPS, then GNSS receiver 100 may be configured to receive satellite signals in any two bands chosen from the L1, L2 and L5 frequency bands. Alternatively, GNSS receiver 100 may be configured to receive all three frequency bands L1, L2 and L5 of GPS. However, it will be apparent that additional or different frequency bands may become available, in which case, the satellites 106 can be configured to transmit GNSS signals 104a-h in any or all such frequency bands and the receiver 100 can be configured to receive and process GNSS signals 104a-h in any or all such bands. Accordingly, changes to the available signal frequency bands are presently contemplated as being within the scope of the present invention.

The receiver 100 is configured to receive the navigation satellite signals from the satellites 106a-d and to process those signals to determine a navigation solution from the received signals. In the example illustrated in FIG. 1, the receiver 100 receives and processes GNSS signals 104b, 104c, 104d/108d, 104e/108e, 104f and 104h. This includes operation in single-band mode, dual-band mode or multi-band mode with respect to at least the frequency bands L1, L2 and L5 and possibly other frequency bands.

Figure 2:
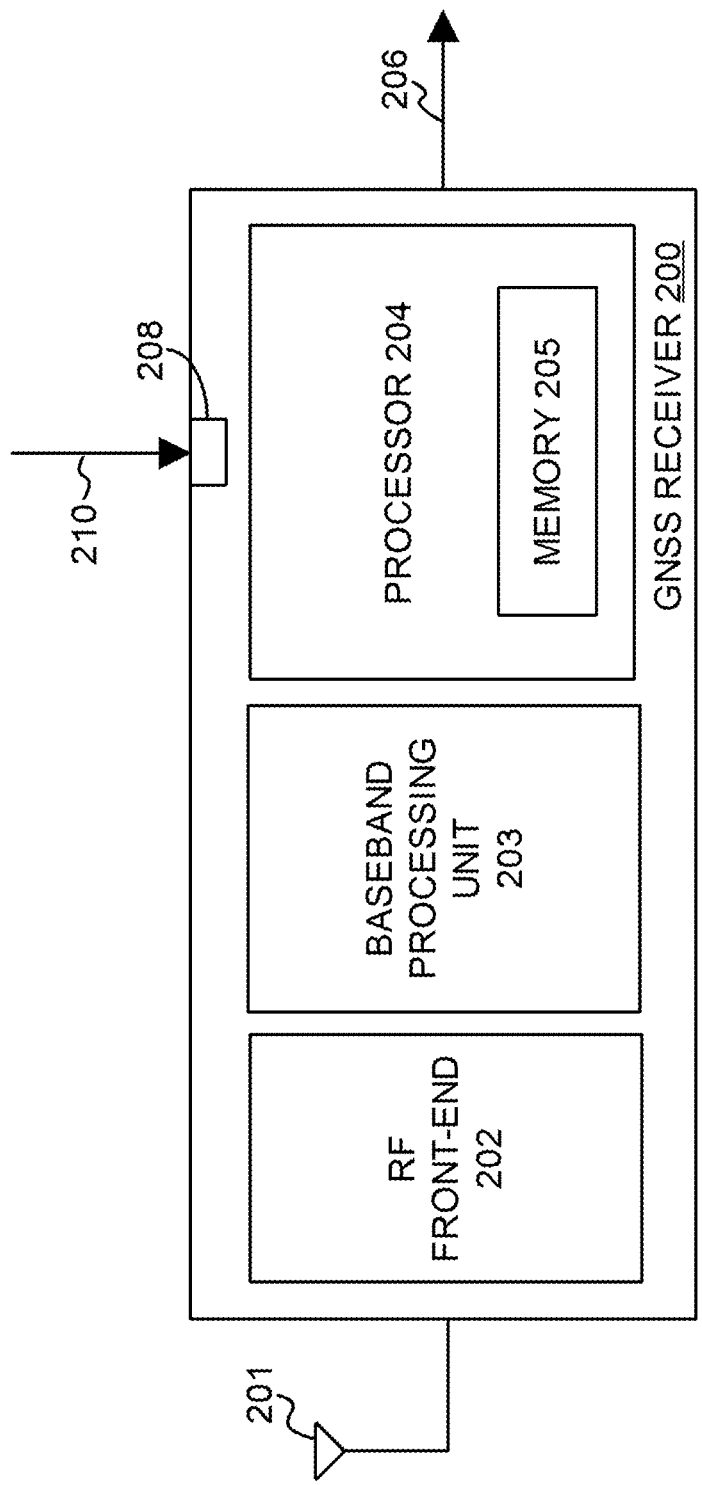
FIG. 2 illustrates a block schematic diagram of a navigation receiver for mitigating multipath interference in accordance with an embodiment of the present invention.

FIG. 2 illustrates a block schematic diagram of a GNSS receiver 200 for mitigating multipath interference in a global navigation satellite system in accordance with an embodiment of the present invention. The receiver 200 can be identical to the GNSS receiver 100 of FIG. 1. As shown in FIG. 2, the GNSS receiver 200 is configured to receive GNSS satellite signals from GNSS satellites via an antenna 201. The received signals are passed from the antenna 201 to RF front-end 202 which performs tasks such as amplification, down-conversion, filtering and digitization of the captured satellite signals. The RF front-end 202 may include further functionality such as frequency synthesis (not shown).

The receiver 200 is further configured to process the received signals using a processor 204 to extract observables and navigation data from each channel of the baseband processing unit and to generate a navigation solution 206. The processor 204 may include an internal or external memory 205 for storing and/or retrieving data associated with the processing.

The navigation solution 206 generated by the receiver 200 may include the calculated position and velocity of the receiver 200 as well as a determination of precise GNSS time. The navigation solution may be derived from any one, or multiple ones of, the GNSS frequency band signals received at the antenna 201, which may include GNSS signals from different GNSS constellations. The navigation solution may also take into account discounting of any one or more of the GNSS frequency band signals received at the antenna 201. More particularly, the receiver 200 receives satellite signals from one or more GNSS constellations and the processor 204 processes these signals to provide GNSS measurements such as pseudo-ranges, carrier phases, rates of pseudo-ranges, etc. to a navigation filter. The processor 204 may, for example, implement the filter, e.g. a Kalman filter or a least-squares (LSQ) filter, which is used to determine the navigation solution 206 based on the GNSS measurements.

The processor 204 may also determine whether multipath interference is likely to be present. This can be accomplished, for example, by performing one or more analyses on the received GNSS signals 104b, 104c, 104d/108d, 104e/

108e, 104f and 104h (FIG. 1). The analyses may be performed in the time domain or the frequency domain, e.g. using FFT. Such analyses are well known in the art, consequently the skilled person will experience no difficulty in selecting one more appropriate analyses for the detection of multipath effects in the satellite signals. Such analyses can include one or more of the following: (1) determining an average of code minus carrier delta range (CMCD) for the received GNSS signals in at least one frequency band; (2) determining code-minus-carrier (CMC) measurements for the received GNSS signals in at least one frequency band; (3) determining Doppler shift for components of the received GNSS signals in at least one frequency band; (4) determining a carrier-to-noise ratio ($C/N_0$) of the received GNSS signals in at least one frequency band; and/or (5) comparing a phase shift or time delay between at least two of an early, prompt and late correlator channel. These various analysis methods can produce a numeric value, e.g. a metric, in which case the determination as to whether multipath interference is likely can be made by comparing the numeric value to a predetermined threshold. This comparison may include, for example, comparing a magnitude of the numeric value to the threshold to trigger an indication that multipath effects are present. As another example, this comparison may include comparing a change in the numeric value produced by any of the aforementioned analytical methods to the threshold to trigger an indication that multipath effects are present.

As is also shown in FIG. 2, the GNSS receiver 200 may include a port 208 which is configured to receive an external input 210 to the receiver 200. Thus, the receiver 200 may receive input 210 from at least the port 208. The port 208 can be, for example, a serial port interface (SPI), RS232 serial port, USB port or a single-ended input such as a processor interrupt. The input port 208 may receive as input one or more indicators of a likelihood of the presence of multipath interference or an indication that the receiver 200 may be in a multipath environment. For example, an upward-facing camera or sky-pointing camera (e.g. equipped with a wide-angle lens, such as a fish-eye lens) may be mounted to the top of a vehicle in which the GNSS receiver 100 is located. The camera may determine whether tall buildings or mountains are present in the proximity of the vehicle via the use of feature detection or image segmentation algorithms, for example, by determining a ratio between blue sky and a total image area of the camera. If the ratio exceeds a predetermined threshold, this can indicate that the receiver 200 is located in a multipath environment in which multipath interference is likely to be present. Accordingly, the ratio (or the fact that the ratio exceeds a threshold) can be conveyed as the input 210 to the processor 204 via the port 208. As another example, a present position of the receiver 200 calculated from processing the received satellite signals can be compared to a map to determine whether the receiver 200 is located in a multipath environment such as a downtown area with tall buildings or an area with steep mountains. Such a comparison may be performed by an external processor which may then signal the receiver 200 via the port 208 with an indicator of a likelihood of the presence of multipath interference as the input 210. In yet another example, a cellular receiver may be provided which detects the presence of cellular base stations. An area with numerous base stations may be presumed to be an urban environment and therefore the number of base stations may represent a likelihood of the presence of multipath interference. Similarly, a Wi-Fi receiver may be provided which detects the presence of wireless network access points. An area with numerous Wi-Fi access points (WAPs) may be presumed to be an urban environment and therefore the number of base stations may represent a likelihood of multipath interference. It will be apparent that the port 208 can be used to receive any type of external input which indicates a likelihood of the presence of multipath interference or that the receiver 200 is likely located in a multipath environment.

Figure 3:
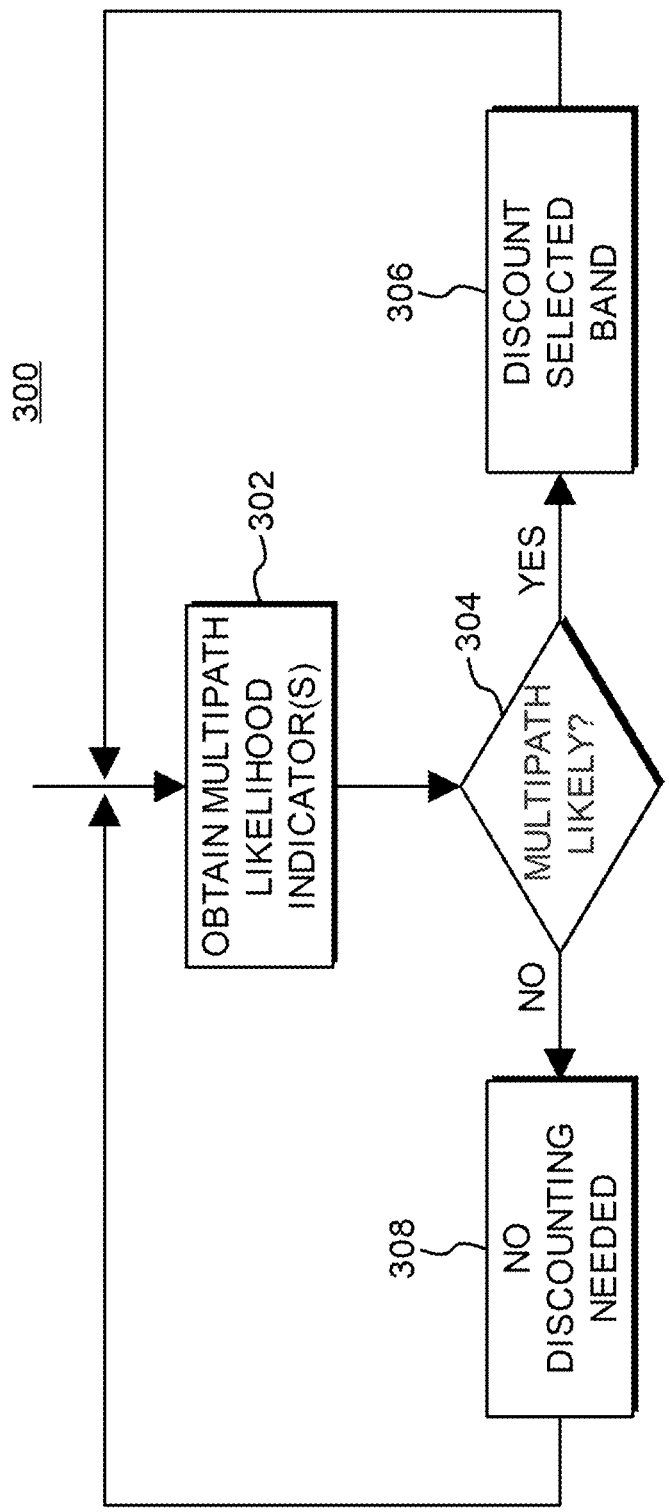
FIG. 3 illustrates a flow diagram of a method of mitigating multipath interference in accordance with an embodiment of the present invention.

FIG. 3 illustrates a flow diagram 300 of a method in accordance with an embodiment of the present invention. In a step 302, an indicator (or multiple indicators) of likelihood of multipath interference is/are obtained. As explained herein, the indicator or indicators can be derived from the received GNSS signals themselves or can be obtained via the external input 210 applied to the port 208. In other words, the indicator or indicators may be obtained in another manner, such as from a camera or a current position of the GNSS receiver 100 (FIG. 1) or the GNSS receiver 200 (FIG. 2) with respect to known signal reflector locations such as mountains or buildings determined, for example, from a map.

In step 304 a determination is made based on the one or more obtained indicators as to whether multipath is likely to be present. This determination can be made in accordance with any of the examples discussed herein or in another manner. For example, if the likelihood indicator is a numeric value, this determination can be made by comparing the numeric value to a predetermined threshold. As another example, this determination can be made by comparing a current position of the GNSS receiver to a map of known signal reflector locations.

If the presence of multipath is likely, then in a step 306, one or more selected frequency bands are discounted. The one or more frequency bands selected for discounting will usually be that band or those bands of frequencies which are more susceptible to multipath effects. In this way, the GNSS receiver can continue to determine a navigation solution using satellite signals from those bands which are more robust to multipath effects. As explained herein, this discounting can include assigning less weight to all satellite signals in the selected frequency band or bands when computing a position fix using signals from that band or bands. Alternatively or additionally, this discounting can include disregarding all signals of the selected frequency band or bands in their entirety when computing a position. In this way the discounting is taken into account for processing the GNSS signals to determine navigation measurements. For example, the discounting may be performed by according navigation measurements obtained from the discounted GNSS signal bands less weight than navigation measurements obtained from non-discounted ones of the received GNSS signals. As another example, the received GNSS signals may be analyzed to determine an extent to which one or more of the received GNSS signals in a particular band are affected by multipath interference. In this case, all signals in that band may be discounted by an amount that is commensurate with the extent to which they are affected by multipath interference. In other words, if one or more of the GNSS signal bands is determined to be heavily affected by multipath interference, then all signals in that band may be discounted to a greater extent than if that signal band was determined to be only lightly affected by multipath interference.

These so-determined navigation measurements can then be further processed to determine spatial coordinates of the receiver 100 (FIG. 1) or receiver 200 (FIG. 2). This processing can be performed in step 306. For example, if the receiver was previously operating in L1/L5 dual-band mode for GPS, then the receiver may transition to operation in L5 single-band only mode in step 306.

If it is determined in step 304 that multipath is not likely to be present then this indicates that the one or more selected frequency bands are not discounted. In this case, in a step 308, processing of the received GNSS signals can be performed without discounting. Generally, this will mean operating the GNSS receiver 100 or receiver 200 in a dual-band or multi-band mode in order to profit from as many available GNSS satellite signals as possible. For example, if the receiver was previously operating in L1/L5 dual-band mode, then the receiver may continue operation in L1/L5 dual-band mode in the step 308.

The process of FIG. 3 can be performed repeatedly and continuously. In this way, the receiver 100 (FIG. 1) or receiver 200 (FIG. 2) may continuously monitor for multipath interference and, if it becomes present, the receiver may then react appropriately. Similarly, once multipath interference is indicated, repeated performance of the process can be expected to detect when multipath interference is no longer present. Thus, the receiver can return to normal operation after an encountered source of multipath interference is no longer present.

More particularly, the process can include: determining that multipath interference is likely (step 304); and, in response to determining that multipath interference is likely, discounting all GNSS signals from at least one frequency band (step 306). The process can also include: determining that the multipath interference is no longer likely (step 304); and, in response to determining that the multipath interference is no longer likely, ceasing the discounting of all GNSS signals in the at least one frequency band (step 308). Thus, in the example above, the receiver may initially be operating in L1/L5 dual-band mode and, then, multipath interference may be detected so that the receiver transitions to L5 single-band mode. Then, when the source of the multipath interference is no longer present, the receiver may detect this and return to operation in the L1/L5 dual-band mode.

The skilled person will quickly realize that the method can also be applied in the case of multi-GNSS. For instance, if receiver 100 or receiver 200 is a multi-GNSS receiver and capable of receiving and processing signals from another GNSS in addition to GPS, then it is trivial based on the teachings herein to adapt the receiver to switch from multi-GNSS to single-band, single-GNSS (e.g. GPS L5 band) if the presence of multipath was determined to be likely in step 304. As before the step of obtaining one or more multipath likelihood indicators (step 302) and determining whether multipath is likely to be present (step 304) based on the one or more indicators can be iterated. In this way, the receiver 100 or receiver 200 may switch back to multi-GNSS once it is determined that the present of multipath is no longer present.

The foregoing detailed description of the present invention is provided for the purposes of illustration and is not intended to be exhaustive or to limit the invention to the embodiments disclosed. Accordingly, the scope of the present invention is defined by the appended claims.

The invention claimed is:

1. A method of mitigating multipath interference in a global navigation satellite system (GNSS) receiver, the method comprising:
   receiving GNSS signals from a plurality of satellites in at least two frequency bands;
   monitoring a likelihood indicator indicative of how likely the received GNSS signals are affected by multipath interference;
   in response to the likelihood indicator indicating the received GNSS signals are affected by multipath interference:
      discounting all GNSS signals from at least one frequency band of the at least two frequency bands; and
      processing the received GNSS signals by taking into account said discounting of all GNSS signals in the at least one frequency band while continuously processing all GNSS signals in the at least two frequency bands to monitor for a reduction in multipath interference; and
   subsequently, in response to the likelihood indicator indicating the received GNSS signals are no longer affected by multipath interference:
      ceasing the discounting of the GNSS signals from the at least one frequency band of the at least two frequency bands.

2. The method according to claim 1, wherein said discounting is performed when the likelihood indicator is above a predetermined threshold.

3. The method according to claim 1, wherein said discounting all GNSS signals in the at least one frequency band comprises discarding of all GNSS signals in one or more of the at least one frequency band.

4. The method according to claim 1, wherein said monitoring the likelihood indicator indicative of how likely the received GNSS signals are affected by multipath interference comprises performing one or more analyses on the received GNSS signals.

5. The method according to claim 4, wherein the one or more analyses are selected from the group consisting of:
   (1) determining an average of code minus carrier delta range (CMCD) for the received GNSS signals in at least one frequency band;
   (2) determining code-minus-carrier (CMC) measurements for the received GNSS signals in at least one frequency band;
   (3) determining Doppler shift for components of the received GNSS signals in at least one frequency band;
   (4) determining a carrier-to-noise ratio ($C/N_0$) of the received GNSS signals in at least one frequency band; and/or
   (5) comparing a phase shift or time delay between at least two of an early, prompt and late correlator channel.

6. The method according to claim 1, wherein said monitoring the likelihood indicator indicative of how likely the received GNSS signals are affected by multipath interference comprises determining whether the GNSS receiver is located in a multipath environment.

7. The method according to claim 1, wherein the at least two frequency bands of the received GNSS signals comprise L1 and L5 frequency bands.

8. The method according to claim 7, wherein said discounting is applied to the L1 frequency band.

9. The method according to claim 1, wherein said processing the received GNSS signals comprises obtaining navigation measurements, wherein the navigation measurements obtained from the discounted GNSS signals are accorded less weight than navigation measurements obtained from non-discounted received GNSS signals.

10. The method according to claim 1, further comprising:
   determining from the received GNSS signals an extent to which one or more of the received GNSS signals are affected by multipath interference; and
   wherein said discounting is performed according to the extent to which the one or more of the received GNSS signals are affected by multipath interference.

11. A global navigation satellite system (GNSS) receiver configured to:
   receive GNSS signals from a plurality of satellites in at least two frequency bands;
   monitor a likelihood indicator indicative of how likely the received GNSS signals are affected by multipath interference; and
   in response to the likelihood indicator indicating the received GNSS signals are affected by multipath interference:
      discount all GNSS signals from at least one frequency band of the at least two frequency bands; and
      process the received GNSS signals by taking into account said discounting of all GNSS signals in the at least one frequency band while continuously processing all GNSS signals in the at least two frequency bands to monitor for a reduction in multipath interference; and
   subsequently, in response to the likelihood indicator indicating the received GNSS signals are no longer affected by multipath interference:
      cease the discounting of the GNSS signals from the at least one frequency band of the at least two frequency bands.

12. The GNSS receiver according to claim 11, wherein the GNSS receiver is configured to discount all GNSS signals from the at least one frequency band when the likelihood indicator is above a predetermined threshold.

13. The GNSS receiver according to claim 11, wherein the GNSS receiver is configured to discount all GNSS signals in the at least one frequency band by discarding of all GNSS signals in one or more of the at least one frequency band.

14. The GNSS receiver according to claim 11, wherein the GNSS receiver comprises a processor configured to monitor the likelihood indicator indicative of how likely the received GNSS signals are affected by multipath interference by performing one or more analyses on the received GNSS signals.

15. The GNSS receiver according to claim 14, wherein the one or more analyses are selected from the group consisting of:
   (1) determine an average of code minus carrier delta range (CMCD) for the received GNSS signals in at least one frequency band;
   (2) determine code-minus-carrier (CMC) measurements for the received GNSS signals in at least one frequency band;
   (3) determine Doppler shift for components of the received GNSS signals in at least one frequency band;
   (4) determine a carrier-to-noise ratio ($C/N_0$) of the received GNSS signals in at least one frequency band; and/or
   (5) compare a phase shift or time delay between at least two of an early, prompt and late correlator channel.

16. The GNSS receiver according to claim 11, wherein the GNSS receiver is configured to monitor the likelihood indicator indicative of how likely the received GNSS signals are affected by multipath interference by using a processor of the receiver to determine whether the GNSS receiver is located in a multipath environment or by receiving an signal that indicates whether the GNSS receiver is located in the multipath environment.

17. The GNSS receiver according to claim 11, wherein the at least two frequency bands of the received GNSS signals comprise L1 and L5 frequency bands.

18. The GNSS receiver according to claim 17, wherein said discounting is applied to the L1 frequency band.

19. The GNSS receiver according to claim 11, wherein the GNSS receiver is further configured to obtain navigation measurements by processing the received GNSS signals and wherein the navigation measurements obtained from the discounted GNSS signals are accorded less weight than the navigation measurements obtained from non-discounted received GNSS signals.

20. The GNSS receiver according to claim 11, wherein the GNSS receiver is configured to:
   determine from the received GNSS signals an extent to which one or more of the received GNSS signals are affected by multipath interference; and
   wherein the GNSS signals from at least one frequency band are discounted according to the extent to which the GNSS signals from at least one frequency band are affected by multipath interference.

* * * * *